3,488,703
EXTRACTION OF MAGNESIUM VALUES FROM BRINES
John Malcolm Lee, Lake Jackson, Tex., assignor to The Dow Chemical Company, Midland, Mich., a corporation of Delaware
No Drawing. Filed Nov. 12, 1965, Ser. No. 507,545
Int. Cl. B01j 9/00
U.S. Cl. 23—312     7 Claims

ABSTRACT OF THE DISCLOSURE

This invention relates to a method for the recovery of magnesium values from magnesium-containing brines which is accomplished by first admixing said brine with at least one mole of a water-soluble anionic surfactant of sodium, potassium and ammonium salts of alkyl sulfates and sulfonates per mole of magnesium to be extracted, intimately contacting such brine-surfactant mixture with a substantially water-insoluble organic extractant of alcohols, esters, ethers and ketones, and finally separating the magnesium-laden organic extractant from the magnesium-depleted brine.

---

This invention relates to a method for the extraction of magnesium values from brines containing the same and, more particularly, to a process for the removal and concentration of magnesium values which occur in relatively low concentrations in brines.

It is known (U.S. Patents 2,671,714 and 2,772,143) that the magnesium values may be removed from brines, e.g. seawater, which are dilute in such values by treatment of the brine with an ion exchange resin. No process has heretofore been available whereby such magnesium values could be continuously extracted in good yield from such brines.

It is an object of this invention to provide a method for concentrating the magnesium values available in magnesium-containing brines. An additional object is to provide an improved extraction process whereby the magnesium values of low concentration in sea water and other brines may be recovered therefrom and concentrated. These and other objects and advantages of the process will be readily appreciated and better understood by reference to the following detailed description.

It has now been discovered that the magnesium values in brines containing the same may be selectively extracted from such brines and recovered as a brine more concentrated in such values. According to the invention, to a brine relatively dilute in magnesium values is added a quantity of an anionic surfactant and the brine-surfactant mixture is extracted with a substantially water-immiscible extractant, the organic phase is separated from the aqueous brine phase and the magnesium values are recovered from the organic extractant phase in a relatively concentrated form.

The process of this invention is useful on any natural or artificial brine containing a significant quantity of magnesium values. Such brines include sea water, Great Salt Lake brines, subterranean brines such as those found in Texas, Michigan, Arkansas, and Utah, and the like. While the process is applicable to brines having a wide variety of compositions, it finds its greatest utility in the concentration of magnesium values from brines wherein the proportion by weight of such values is only from about 50 p.p.m. to about 5%. If such brines contain calcium and/or lithium values in addition to the magnesium values, some co-extraction of such values will occur.

The anionic surfactant used herein can be any substantially water-miscible sodium, potassium, or ammonium salt of a high molecular weight alkyl sulfate, or sulfonate such as dioctyl ester of sodium sulfosuccinic acid, sodium salt of dodecylbenzene sulfonate, sodium salt of sulfated lauryl alcohol, sodium salt of sulfated nonylphenol-ethylene oxide adduct, dioctyl ester of sodium sulfosuccinic acid, sodium salt of dodecylated oxydibenzene disulfonate, and the like, or a mixture of any two or more of such salts. The amount of such anionic surfactant to be added to the magnesium-containing brine will vary depending on the nature of the brine and upon the magnesium content thereof. Usually, however, from about 0.9 to about 2.0 moles of anionic surfactant are added per mole of magnesium contained in the brine. Preferably about 1.0 to about 1.5 moles of surfactant per mole of magnesium is employed.

It is necessary that the anionic surfactant be intimately admixed with the magnesium-containing brine to be treated in order to insure contact between the magnesium ions and the anionic surfactant. Such admixture is achieved in conventional ways such as stirring, agitating, shaking and the like.

The magnesium values in combination with the anionic surfactant are removed from the brine solution by contacting the mixture with a substantially water-immiscible organic extractant which is a liquid at ambient temperatures. Useful organic extractants include alcohols such as n-octanol, n-butanol, n-hexanol, n-decyl alcohol; esters such as ethyl trichloroacetate, n-butyl benzoate; ethers such as butyl ether; ketones such as fenchone; hydrocarbons such as isoprene; and the like. Such extractants may be used alone or in combination with one another.

In carrying out the extraction, the aqueous mixture is treated with the organic extractant in conventional liquid-liquid extraction apparatus, e.g. single or multiple stage mixer-settlers, countercurrent contractors and the like, at temperatures of from about 0° C. to 40° C., preferably at or near room temperature, for a period of actual contact ranging from about 5 to about 30 minutes. The efficient ratio of organic extractant to aqueous mixture will range from about 0.2:1.0 to about 4.0:1.0 by volume depending largely upon the number of stages employed and the effectiveness of contact between the aqueous and organic phases.

After the extraction step, the organic and aqueous phases are allowed to form separate layers and the phases are separated. The magnesium-depleted aqueous brine phases may be discarded or it may be further treated to remove the last traces of organic extractant by heating and/or the application of vacuum to distill any remaining organic extractant therefrom, or such brine phase may be contacted with highly water-immiscible solvent and again separated.

The magnesium-laden organic phase, once separated from the aqueous phase, may be treated to separate the magnesium values therefrom by such methods as distillation of the organic extractant to leave the magnesium values as a residue. It is preferred, however, to strip the magnesium values from such magnesium-laden extractant by contacting such extractant with a water-soluble salt such as NaCl. The addition of such a water-soluble salt causes the magnesium values, together with the water contained in the organic extractant, to form a separate aqueous phase. In most instances, it is desirable to add the soluble salt as a solid to thereby assure substantially complete release of the water and magnesium values from the organic extractant. In some instances, however, where water solubility in the organic extractant is very low, it is advantageous to add a saturated aqueous solution of such soluble salt. The aqueous brine thus produced contains a relatively high concentration of magnesium values. In such relatively high concentration, the magnesium values may be easily and economically recovered by known methods such as removal by ion exchange.

The following examples will serve to further illustrate the process of the present invention but are not meant to limit such invention thereto.

EXAMPLE 1

To a sample of 432.5 grams of sea water was added 84.8 grams of an aqueous solution of dioctyl ester of sodium sulfosuccinic acid containing 85.2 per cent by weight of such ester. The mixture was thoroughly agitated by shaking for a period of 30 minutes. To such mixture was added 203.5 grams of 2-octanol. After vigorous agitation for a period of 30 minutes, the organic and aqueous phases were allowed to separate and the aqueous phase was withdrawn and analyzed. To the organic phase was added 4 grams of solid NaCl. The mixture was then stirred and allowed to separate into two layers. The aqueous brine layer weighed 13.8 grams and the remaining organic layer weighed 259.86 grams. Analysis of the various aqueous and organic phases revealed the following:

|  | Surfactant | Seawater | Single Stage Separation | | | |
|---|---|---|---|---|---|---|
|  |  |  | Mg depleted, aqueous phase | Mg laden, organic extractant | Mg depleted, organic extractant | Product Mg laden, brine |
| Mg (p.p.m.) | 2.4 | 1,000 | 440 | 1,000 | 830 | 1,900 |
| Ca (p.p.m.) | 5.8 | 320 | 120 | 190 | 140 | 510 |
| Density |  |  | 1.0276 | 0.898 | 0.893 | 1.172 |

It will be noted that the process of this invention, to a lesser extent, is useful for the removal of calcium values from brines.

EXAMPLE 2

In order to demonstrate the effectiveness of a large number and variety of water-immiscible organic extractants in the process of this invention, a large volume of seawater containing 1000 p.p.m. Mg values and 320 p.p.m. calcium values was thoroughly mixed with a solution of dioctyl ester of sodium sulfosuccinic acid in a ratio of 80 parts by volume of seawater to 20 parts by volume of a 75 weight per cent solution of such ester in water.

Samples of such seawater-surfactant mixture were agitated for 30 minutes with a substantially water-immiscible organic extractant, the layers were allowed to separate and were analyzed. The results are shown in the following table:

I claim:
1. A process for the recovery of magnesium values from magnesium-containing brines which comprises admixing with said brine at least one mole of a water-soluble anionic surfactant selected from the group consisting of the sodium, potassium and ammonium salts of high molecular weight alkyl sulfates and sulfonates per mole of magnesium contained in said brines, contacting such brine-surfactant mixture with a substantially water-immiscible liquid organic extractant selected from the group consisting of alcohols, esters, ethers, and ketones, and separating the magnesium-laden organic extractant from the magnesium-depleted brine.

2. The process of claim 1 wherein the magnesium-laden organic extractant is contacted with a quantity of water soluble salt sufficient to release the magnesium values therefrom and the magnesium values are separated from the magnesium depleted organic extractant.

3. The process of claim 1 wherein the magnesium-containing brine is seawater.

4. The process of claim 1 wherein the water-soluble anionic surfactant is the dioctyl ester of sodium sulfosuccinic acid.

5. The process of claim 1 wherein the substantially water-immiscible organic extractant is n-octanol.

6. The process of claim 2 wherein the water-soluble salt is sodium chloride.

7. The process of claim 1 wherein the anionic surfactant is selected from the group consisting of the dodecyl ester of sodium sulfosuccinic acid, the sodium salt of dodecyl benzene sulfonate, the sodium salt of sulfated lauryl alcohol, sodium salt of nonylphenylethylene oxide adduct and the sodium salt of dodecylated oxydibenzene disulfonate and wherein the seawater-surfactant mixture is contacted with from 0.2 to 4.0 volumes of the substantially water-insoluble organic extractant, the magnesium-laden organic extractant is separated from the magnesium-depleted brine, the magnesium-laden organic extractant is contacted with a quantity of sodium chloride sufficient to release a substantial portion of the magnesium

TABLE (EXAMPLE 2)

|  | Extraction Solvent | Solvent ratio [1] | Remarks | Analysis | | | | | |
|---|---|---|---|---|---|---|---|---|---|
|  |  |  |  | Organic Phase | | | Aqueous Phase | | |
|  |  |  |  | P.p.m. Mg | P.p.m. Ca | Percent H₂O | P.p.m. Mg | P.p.m. Ca | Percent carbon |
| Run Number: |  |  |  |  |  |  |  |  |  |
| 1 | n-Hexyl alcohol | 1/1 | 2 clear phases, fast separation. | 620 | 200 | 12.0 | 450 | 140 | 0.48 |
| 2 | 2-octyl alcohol | 1/1 | do | 620 | 200 | 9.4 | 450 | 120 | 0.43 |
| 3 | Ethyl trichloroacetate | 1/1 | 2 clear phases, slow separation. | 250 | 130 | 4.9 | 700 | 130 | 3.4 |
| 4 | Butyl ether | 1/1 | do | 650 | 190 | 12.0 | 570 | 140 | 0.88 |
| 5 | n-Decyl alcohol | 1/1 | do | 420 | 150 | 10.0 | 550 | 120 | 0.86 |
| 6 | Chloropicrin | 1/2 | Yellow organic phase, cloudy aqueous phase. | 500 | 180 | 8.3 |  |  |  |
| 7 | n-Butyl benzoate | 1/2 | do | 600 | 210 | 17.8 |  |  |  |
| 8 | Isoprene | 1/2 | do | 950 | 340 | 13.6 |  |  |  |
| 9 | Fenchone | 1/2 | do | 760 | 280 | 12.8 |  |  |  |
| 10 | 2-octyl alcohol | 1/2 | Two clear phases | 1,000 | 340 | 12.8 |  |  |  |
| 11 | Fenchone | 1/1 | do | 450 | 200 | 6.8 |  |  |  |

[1] Solvent ratio is the volume ratio of solvent to the seawater-surfactant mixture.

Various modifications can be made in the present invention without departing from the spirit or scope thereof for it is understood that we limit ourselves only as defined in the appended claims.

values therefrom and such magnesium values are separated from the magnesium-depleted organic extractant.

(References on following page)

References Cited

UNITED STATES PATENTS

| | | | |
|---|---|---|---|
| 2,381,994 | 8/1945 | Belchetz | 23—312 X |
| 2,967,825 | 1/1961 | Baniel | 23—312 X |
| 3,074,820 | 1/1963 | Kunin | 210—21 X |
| 3,219,422 | 11/1965 | Ellis | 210—21 X |
| 3,240,556 | 3/1966 | Bhappu | 210—38 X |
| 3,341,282 | 9/1967 | Kimberlin | 23—312 X |
| 3,352,634 | 11/1967 | Buchmann | 23—91 |

NORMAN YUDKOFF, Primary Examiner

S. J. EMERY, Assistant Examiner

U.S. Cl. X.R.

23—91; 210—21, 38